(12) United States Patent
Seiner

(10) Patent No.: US 7,240,493 B2
(45) Date of Patent: Jul. 10, 2007

(54) METHOD AND DEVICE FOR REDUCING ENGINE NOISE

(75) Inventor: John M. Seiner, Oxford, MS (US)

(73) Assignee: The University of Mississippi, University, MS (US)

( * ) Notice: Subject to any disclaimer, the term of this patent is extended or adjusted under 35 U.S.C. 154(b) by 72 days.

(21) Appl. No.: 10/999,449

(22) Filed: Nov. 30, 2004

(65) Prior Publication Data
US 2006/0053767 A1 Mar. 16, 2006

Related U.S. Application Data

(60) Provisional application No. 60/525,912, filed on Dec. 1, 2003.

(51) Int. Cl.
F02K 1/34 (2006.01)
(52) U.S. Cl. .................... 60/770; 239/265.11
(58) Field of Classification Search ............ 60/770; 239/265.11–265.43; 181/213, 215, 219
See application file for complete search history.

(56) References Cited

U.S. PATENT DOCUMENTS

| 2,801,516 | A |   | 8/1957  | Battle et al. |             |
|-----------|---|---|---------|---------------|-------------|
| 2,972,226 | A |   | 2/1961  | Geary         |             |
| 2,984,068 | A |   | 5/1961  | Eatock        |             |
| 2,999,354 | A |   | 9/1961  | Gallo et al.  |             |
| 3,184,917 | A | * | 5/1965  | Caouette et al. | 239/265.33 |
| 3,251,553 | A | * | 5/1966  | Fitton et al. | 239/127.3   |
| 3,892,358 | A | * | 7/1975  | Gisslen       | 239/265.39  |
| 3,979,065 | A |   | 9/1976  | Madden        |             |
| 3,982,696 | A |   | 9/1976  | Gordon        |             |
| 4,066,214 | A |   | 1/1978  | Johnson       |             |
| 4,077,206 | A |   | 3/1978  | Ayyagari      |             |
| 4,081,137 | A |   | 3/1978  | Sutton et al. |             |
| 4,117,671 | A |   | 10/1978 | Neal et al.   |             |
| 4,422,524 | A |   | 12/1983 | Osborn        |             |
| 4,487,017 | A |   | 12/1984 | Rodgers       |             |
| 4,878,618 | A | * | 11/1989 | Hufnagel      | 239/265.39  |
| 4,994,660 | A | * | 2/1991  | Hauer         | 239/265.41  |
| 5,039,014 | A | * | 8/1991  | Lippmeier     | 239/265.39  |
| 5,120,005 | A | * | 6/1992  | Reedy         | 244/113     |
| 5,215,256 | A | * | 6/1993  | Barcza        | 239/265.39  |
| 5,232,158 | A | * | 8/1993  | Barcza        | 239/265.35  |
| 5,261,605 | A | * | 11/1993 | McLafferty et al. | 239/265.35 |

(Continued)

OTHER PUBLICATIONS

Grosch, et al., "Numerical Simulation of Mixing Enhancement In a Hot Supersonic Jet", Physics of Fluids, 1997, vol. 9, Part 4, pp. 1125-1143.

(Continued)

*Primary Examiner*—William H. Rodriguez
(74) *Attorney, Agent, or Firm*—Stites & Harbison PLLC; Richard S. Myers, Jr.

(57) ABSTRACT

A method and device to reduce the noise produced by jet aircraft engines and/or other supersonic nozzles involves the use of corrugated engine seals (30) for the secondary internal divergent flaps (14) of the nozzle (10). Such corrugated seals (30) serve not only to eliminate shock-generated noise, but also generate a counter-rotating vorticity to force low speed mixing of surrounding ambient air with the high-speed jet exhaust. Lower exhaust velocities, combined with reduced levels of the turbulent Reynolds shear stress, lead to reduction of turbulence-generated noise, including Mach wave emission.

19 Claims, 14 Drawing Sheets

U.S. PATENT DOCUMENTS

| | | | | |
|---|---|---|---|---|
| 5,269,467 A | * | 12/1993 | Williams et al. | 239/265.41 |
| 5,285,637 A | * | 2/1994 | Barcza | 239/265.35 |
| 5,437,411 A | * | 8/1995 | Renggli | 239/265.39 |
| 5,484,105 A | * | 1/1996 | Ausdenmoore et al. | 239/127.3 |
| 5,485,959 A | * | 1/1996 | Wood et al. | 239/265.41 |
| 5,667,140 A | * | 9/1997 | Johnson et al. | 239/265.33 |
| 5,683,034 A | * | 11/1997 | Johnson et al. | 239/265.35 |
| 5,713,522 A | * | 2/1998 | Lundberg | 239/265.39 |
| 5,771,681 A | * | 6/1998 | Rudolph | 60/262 |
| 5,797,544 A | * | 8/1998 | Ward | 239/265.37 |
| 6,082,635 A | | 7/2000 | Seiner et al. | |
| 6,347,510 B1 | | 2/2002 | McAlice et al. | |
| 6,626,440 B2 | * | 9/2003 | Halling | 277/626 |
| 6,968,615 B1 | * | 11/2005 | More et al. | 29/888.3 |
| 7,032,835 B2 | * | 4/2006 | Murphy et al. | 239/128 |

OTHER PUBLICATIONS

Liepman, et al., "Elements of Gasdynamics," Dover Publications, Inc., Mineola, New York; 1985, pp. 284-304.

Seiner, et al., "Mach Wave Emission From a High Temperature Supersonic Jet," AIAA J., 1994; vol. 32, No. 12, pp. 2345-2350.

* cited by examiner

METHOD AND DEVICE FOR REDUCING ENGINE NOISE

PRIORTY

This application claims priority to U.S. Provisional Application Ser. No. 60/525,912 filed Dec. 1, 2003, the entire disclosure of which is incorporated herein by reference.

GOVERNMENT SUPPORT

This invention was made with assistance from Grant Numbers N00014-02-1-0871 and N00014-02-1-0380 from the Office of Naval Research.The United States Government has rights to this invention.

FIELD OF THE INVENTION

The present invention relates to the field of jet aircraft engines and/or other supersonic nozzles, and, more particularly, to a method and device to reduce the noise produced by jet aircraft engines and/or other supersonic nozzles through the use of corrugated seals for the secondary internal divergent flaps of the nozzle. Furthermore, the present invention contemplates the use of prism-shaped extensions or chevrons attached to the primary outer flaps of the nozzle for further reduction of noise without any loss of aero-performance.

BACKGROUND OF THE INVENTION

The method and device of the present invention has particular applicability for the jet engines of a military aircraft, such as the U.S. Navy's F/A-18 E/F Super Hornet aircraft in performance of the Field Carrier Landing Practice (FCLP) mission profile. During performance of the FCLP mission profile, military aircraft, such as the F/A-18 E/F, operate with variable area engine nozzles which are scheduled to be highly overexpanded. This means that the nozzle exit static pressure is significantly below the surrounding ambient pressure at the aircraft's altitude above ground level. This overexpanded exhaust flow contains shocks in the exhaust plumes, the presence of which generates an efficient noise production mechanism known as "shock noise." For a further discussion of shock noise, reference is made to Seiner, J. M., 1984, "Advances in High-Speed Jet Aeroacoustics," Invited Lecture, AIAA Paper No. 84-2275. This publication is incorporated herein by this reference.

Furthermore, it is well-recognized that an overexpanded nozzle has a lower aerodynamic performance efficiency than one that is fully expanded, i.e., where the exhaust static pressure equals the local aircraft ambient pressure. See Liepman, H. W., and Roshko, A., 1985, "Elements of Gasdynamics," Dover Publications, Inc., Mineola, N.Y., a publication which is also incorporated herein by this reference. In any event, reduction of shock noise can generally be accomplished by design of the nozzle geometry to achieve fully expanded flow at the nozzle exit, where the exhaust static pressure is equal to ambient pressure.

In addition to shock noise, an additional efficient noise generating mechanism is present within a supersonic exhaust regardless of whether it contains shocks. This noise generating mechanism is referred to as Mach wave emission. See Seiner, J. M., Bhat, T. R. S., and Ponton, M. K., 1994, "Mach Wave Emission From a High Temperature Supersonic Jet," AIAA J., Vol. 32, No. 12, pp. 2345–2350, a publication which is also incorporated herein by this reference. To minimize this noise source requires that the high-speed exhaust be forced to mix with the slower moving surrounding air to achieve lower velocities in the exhaust plume than would otherwise occur naturally. Lower exhaust velocities, combined with reduced levels of the turbulent Reynolds shear stress, lead to reduction of turbulence-generated noise, including Mach wave emission.

Accordingly, it would be desirable to provide a method and device to substantially reduce shock noise by providing a nozzle design and construction to achieve fully expanded flow at the nozzle exit, while at the same time, generating the appropriate counter-rotating vorticity to force low speed mixing of surrounding ambient air with the high-speed exhaust to reduce turbulence-generated noise.

SUMMARY OF THE INVENTION

The present invention is a method and device to reduce the noise produced by jet aircraft engines and/or other supersonic nozzles through the use of corrugated seals for the secondary internal divergent flaps of the nozzle.

In one exemplary embodiment of the present invention, each corrugated seal has a cross-sectional shape of a truncated super ellipse of high aspect ratio with a circular quadrant extension from each side of the super ellipse to create a substantially horizontal portion at the surface of the corrugated seal. After determining the nozzle area distribution for shock-free flow at a particular power setting, the difference between the original cross-sectional area of the nozzle at any given point along the length of the nozzle and the calculated cross-sectional area for shock-free flow can be computed. This difference is then divided by the number of corrugated seals to be installed. By making such a computation at discrete axial locations along the length of the nozzle, and assuming that the general cross-sectional shape of the corrugated seal remains constant, a topological surface geometry for each corrugated seal is established.

Once these corrugated seals are installed in the nozzle, they serve not only to eliminate shock-generated noise, but also generate a counter-rotating vorticity to force low speed mixing of surrounding ambient air with the high-speed exhaust. Lower exhaust velocities, combined with reduced levels of the turbulent Reynolds shear stress, lead to reduction of turbulence-generated noise, including Mach wave emission.

Furthermore, the present invention contemplates the use of prism-shaped extensions or chevrons attached to the primary outer flaps of the nozzle to control thrust augmentation associated with corrugated seals and enhance the level of forced mixing for additional noise reduction without any loss of aero-performance.

DESCRIPTION OF THE INVENTION

The present invention is a method and device to reduce the noise produced by jet aircraft engines and/or other supersonic nozzles through the use of corrugated seals for the secondary internal divergent flaps of the jet aircraft engine. Furthermore, the present invention contemplates the use of prism-shaped extensions or chevrons attached to the primary outer flaps of the nozzle to control thrust augmentation associated with corrugated seals and enhance the level of forced mixing for additional noise reduction without any loss of aero-performance.

Figure 1:
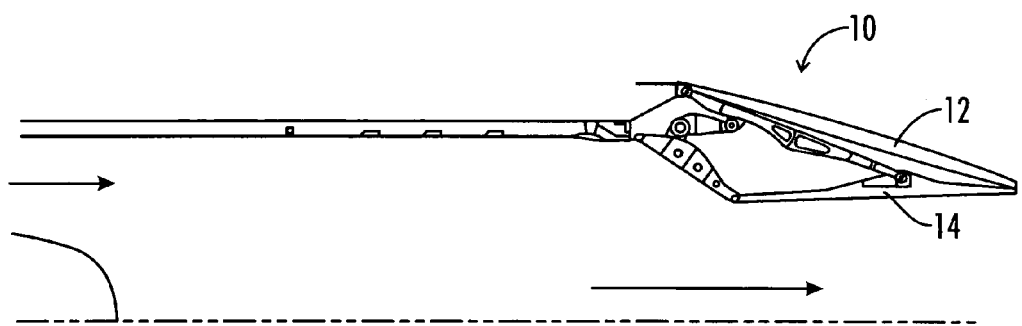
FIG. 1 is a partial sectional view of the exhaust nozzle of a jet aircraft engine.

FIG. 1 is a partial sectional view of the exhaust nozzle 10 of a jet aircraft engine. Such an exhaust nozzle 10 defines a flowpath, as indicated by the arrows in FIG. 1, for engine exhaust gas which exits generally horizontally from an aft end of an aircraft. The nozzle 10 generally includes a converging portion and a diverging portion downstream from the converging portion. As gas moves through the nozzle 10, from the converging portion through the diverging portion, the cross-sectional area available for gas flow decreases in the converging portion and increases in the diverging portion. A plane of minimum cross-sectional area, known as a "throat" is located between the converging portion of the nozzle 10 and the diverging portion.

Figure 5:
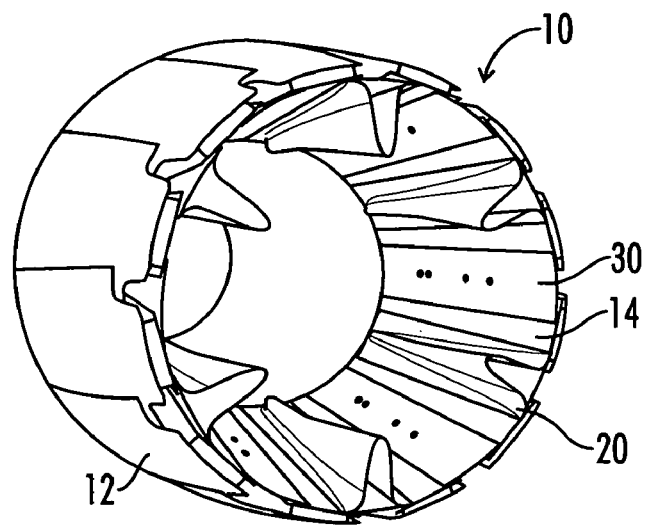
FIG. 5 is a perspective view of an engine nozzle, including six of the exemplary corrugated seals of FIGS. 3 and 4.
Figure 6:
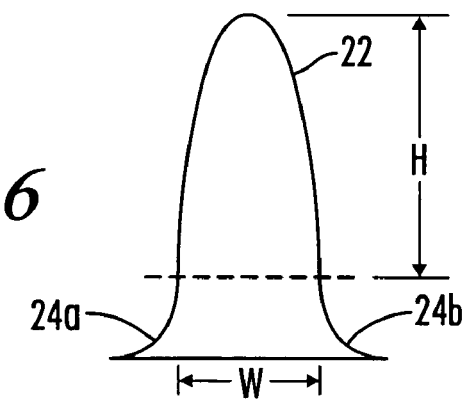
FIG. 6 illustrates the general cross-sectional shape of the exemplary corrugated seal of FIGS. 3 and 4.
Figure 7:
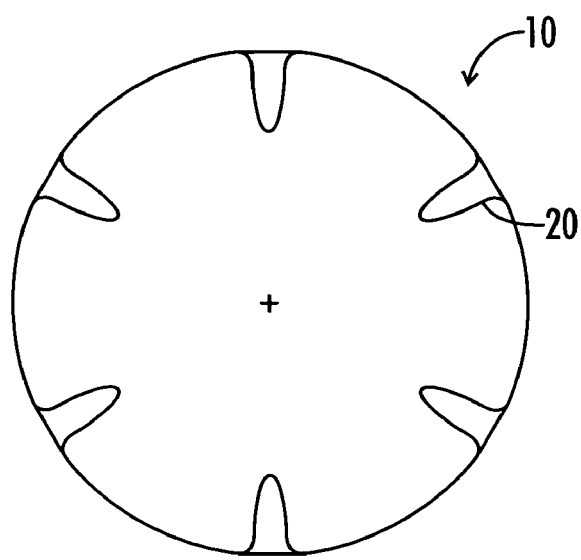
FIG. 7 illustrates the general cross-sectional shape and positioning of six exemplary corrugated seals installed in an engine nozzle.

Of particular importance to the present invention, the nozzle 10 includes circumferentially spaced primary outer divergent flaps 12, which are pivotable to alter the cross-sectional area as the gas exits the nozzle 10. Furthermore, the nozzle 10 includes secondary internal divergent flaps 14. The relationship and positioning of the respective flaps 12, 14 is further illustrated in FIG. 5. In any event, such a construction of the exhaust nozzle 10 of a jet aircraft engine is well-known and understood by one of ordinary skill in the art.

Figure 2:
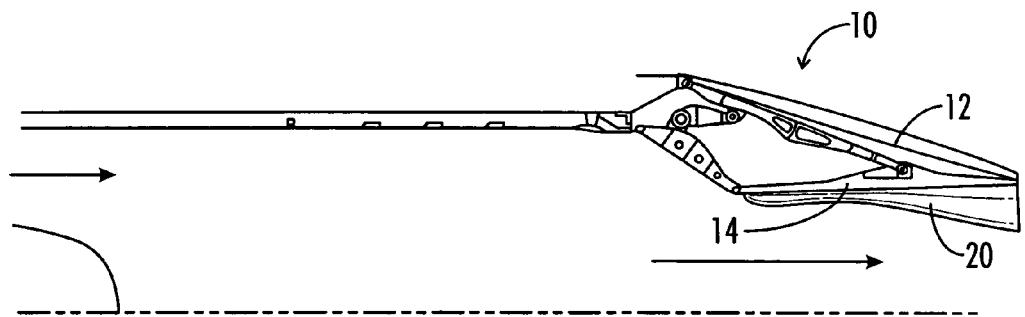
FIG. 2 is a partial sectional view of the exhaust nozzle of a jet aircraft engine similar to that of FIG. 1, but illustrating the use of corrugated engine seals in accordance with the present invention.

FIG. 2 is a partial sectional view of the exhaust nozzle 10 of a jet aircraft engine similar to that of FIG. 1, but illustrating the use of corrugated engine seals 20 in accordance with the present invention. Specifically, such corrugated engine seals 20 replace a predetermined number of the standard seals for the secondary internal divergent flaps 14 of the jet aircraft engine 10. For example, in the exemplary embodiment illustrated in FIG. 5, there are six corrugated engine seals 20 and six standard seals 30. In other words, every other standard seal 30 has been replaced by a corrugated engine seal 20 made in accordance with the present invention.

In determining the appropriate geometry for these corrugated engine seals 20 to maximize their ability to reduce noise, first, it is important to identify the pertinent aircraft altitudes with engine power settings that define the mission profile. Furthermore, aircraft configuration, such as wing loading, landing gear position, and flap position, are important for proper determination of aircraft speed at a particular power setting. As mentioned above, the present invention has particular applicability for the jet engines of a supersonic aircraft, such as the U.S. Navy's F/A-18 E/F Super Hornet aircraft in performance of the Field Carrier Landing Practice (FCLP) mission profile. This aircraft uses F404-402 engines manufactured by General Electric Aircraft Engines ("GEAE") of Cincinnati, Ohio.

Then, certain operating parameters of the aircraft and engines associated with the defined mission profile must be determined. This can be achieved through the running of an installed engine cycle deck for the engine, which is a simulation that generates aerothermal numerical representations to characterize engine performance. Often, engine cycle decks for specific engines are available from the engine manufacturer or the U.S. Government Federal Laboratory responsible for a military aircraft's mission.

In any event, the most effective noise reduction design is often associated with the maximum engine thrust for the particular mission. The maximum thrust for the U.S. Navy's F/A-18 E/F Super Hornet or other military aircraft is commonly referred to as "Military Engine Power" or "Mil-Pwr." From the installed engine cycle deck, the engine nozzle pressure ratio, exit static pressure, engine total temperature after mixing with the fan engine flow, engine weight flow, throat area, nozzle exit area, and ambient pressure and temperature at altitude are determined at Mil-Pwr. Isentropic equations, such as those described in Liepman, H. W., and Roshko, A., 1985, "Elements of Gasdynamics", Dover Publications, Inc., Mineola, N.Y. (referenced above), can then be used to compute the nozzle exit Mach number and Mach number for fully expanded flow where the exit static pressure matches that of ambient pressure.

After determining the operating parameters at Mil-Pwr or another power setting of interest, a Method of Characteristics (MOC) solution is obtained based on the actual throat area and an exit area that that produces fully expanded flow for the nozzle pressure ratio and total temperature as determined from the engine cycle deck. For engine nozzles with standard, substantially flat seals, a high-order polygonal exit area is assumed. For example, for the GEAE F404-402 engines referenced above, a twelve-sided exit area is assumed. MOC nozzle codes are generally available from various sources, including U.S. Government Federal Laboratories.

The MOC solution provides an area distribution from the throat of the nozzle to exit of the nozzle that produces shock-free flow. In other words, the MOC solution establishes a optimal cross-sectional area at axial locations along the length of the nozzle for producing shock-free flow. Of course, this area distribution includes values that are always smaller than the existing nozzle area distribution if the flow was overexpanded, and values that are greater if the flow was underexpanded. As mentioned above, military aircraft generally have variable area engine nozzles which are scheduled to be highly overexpanded.

Once the optimal area distribution from the throat of the nozzle to exit of the nozzle has been determined through the MOC solution, the appropriate geometry and dimensions for the corrugated seals 20 can be determined. Referring now to FIGS. 3–7, it has been determined that an appropriate cross-sectional shape for a corrugated seal 20 made in accordance with the present invention is that of a truncated super ellipse of high aspect ratio with a circular quadrant extension from each side of the super ellipse to create a substantially horizontal portion at the surface of the corrugated seal 20, which facilitates attachment to a nozzle. This general shape is perhaps best illustrated in FIG. 6, with the truncated super ellipse portion being identified by reference numeral 22, and the respective circular quadrant extensions being identified by reference numerals 24a and 24b. Such a cross-sectional shape produces strong counter-rotating vorticity for the desired forced mixing of high-speed with low-speed flow. Furthermore, and referring still to FIG. 6, through experimentation, it has been determined that an appropriate aspect ratio for the super ellipse is approximately 4:1 (H v. W), which, in the exemplary embodiment illustrated in FIGS. 3–7, is substantially constant along the length of the nozzle.

In any event, the numerical dimensions of the corrugated seals 20 are selected so as to provide the area distribution required to produce shock-free flow. In other words, and as mentioned above, the MOC solution establishes a optimal cross-sectional area at axial locations along the length of the nozzle for producing shock-free flow. Thus, the penetration of the corrugated seals 20 into the exhaust flow (i.e., the height of the seals) is determined by the difference in area distribution of the original nozzle compared to the calculated area distribution for shock-free flow.

Specifically, after having determined the area distribution for shock-free flow at a particular power setting (e.g., Mil-Pwr), the difference between the original cross-sectional area of the nozzle at any given point along the length of the nozzle and the calculated cross-sectional area for shock-free flow can be computed. This difference is then divided by the number of corrugated seals 20 to be installed. As mentioned above, in the exemplary embodiment illustrated in FIG. 5, there are six corrugated engine seals 20. Accordingly, the difference in cross-sectional area would be divided by six. For example, if the original cross-sectional area was 240 square inches at a given axial location, and the MOC solution indicated that the optimal cross-sectional area at this axial location for producing shock-free flow was 210 square inches, the difference would be 30 square inches. Dividing by the number of seals, six, would indicate that the cross-sectional area for a corrugated seal at this axial location should be five square inches.

Figure 3:
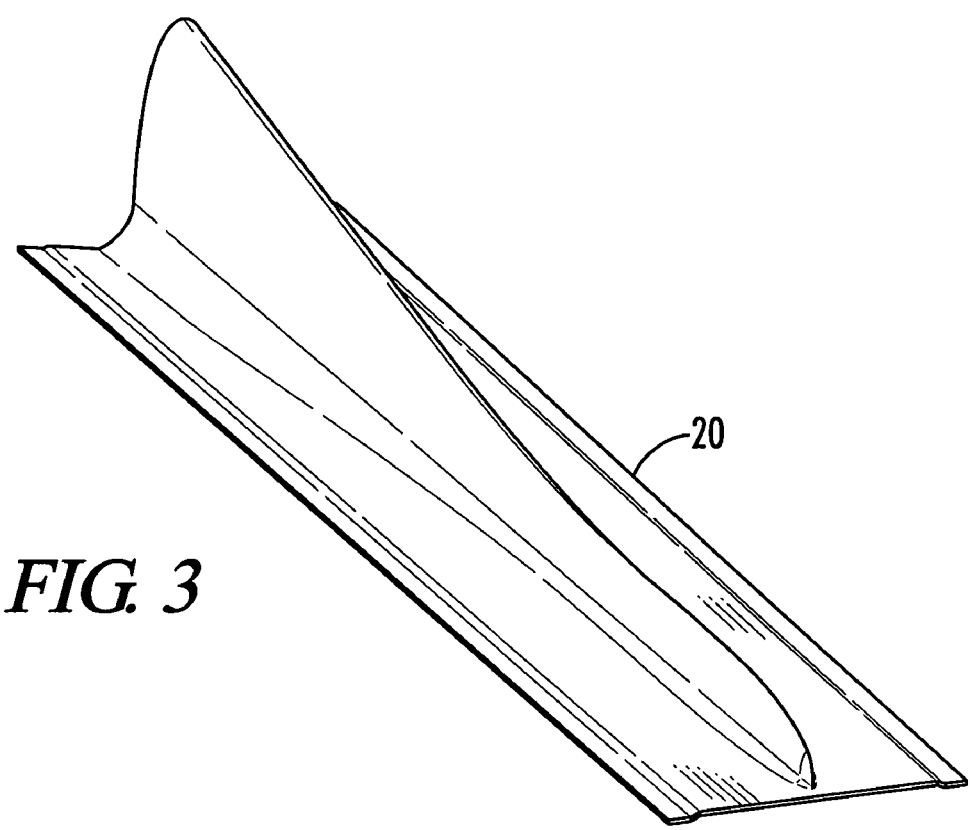
FIG. 3 is a perspective view of an exemplary corrugated seal made in accordance with the present invention.
Figure 4:
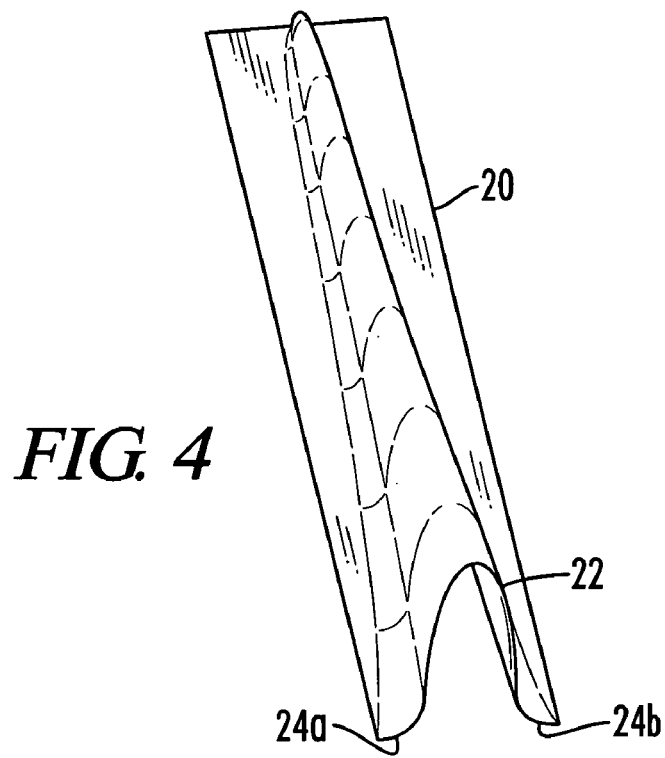
FIG. 4 is a perspective view of the exemplary corrugated seal of FIG. 3.

By making such a computation at discrete axial locations along the length of the nozzle, and assuming that the general cross-sectional shape of the corrugated seal 20 remains constant, a topological surface geometry for the corrugated seal 20 is established. In other words, the slope or contour of the corrugated seal 20 along its length is established, perhaps as best illustrated in FIGS. 3 and 4. As mentioned above, in addition to elimination of shock noise, the shape of the corrugated seals 20 generates counter-rotating vorticity to force low speed mixing of surrounding ambient air with the high-speed exhaust. Lower exhaust velocities, combined with reduced levels of the turbulent Reynolds shear stress, lead to reduction of turbulence-generated noise, including Mach wave emission.

Therefore to the extent that the method of the present invention is applied to a jet engine design, it may be generally characterized as including the following steps: (1) identifying a mission profile and power setting of interest for the engine; (2) determining certain operating parameters of the engine based on the mission profile; (3) obtaining a Method of Characteristics (MOC) solution based on the certain operating parameters that produces fully expanded flow; (4) determining an appropriate geometry and dimensions for a predetermined number of corrugated seals based on the MOC solution; and (5) installing such corrugated seals in the engine nozzle.

Model Testing

To confirm the efficacy of the method and device of the present invention as described above, 1/10th scale model testing of the corrugated seal geometry was conducted for certain power settings identified in the engine cycle deck for the F404-402 engines manufactured by General Electric Aircraft Engines of Cincinnati, Ohio.

Figure 8:
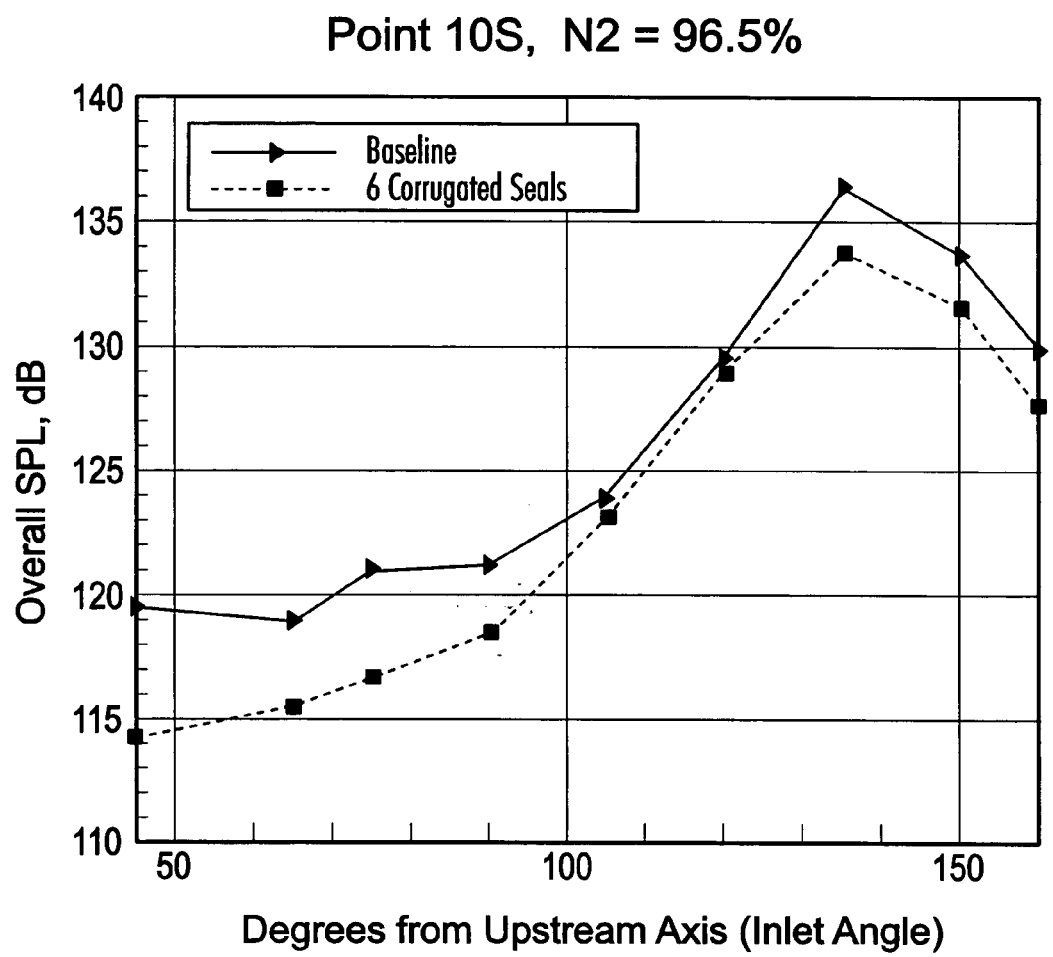
FIG. 8 is a chart illustrating the measured sound pressure level for a GEAE F404-402 engine at Mil-Pwr, N2=96.5% based on model testing, specifically comparing the measured sound pressure level with and without the corrugated seals of the present invention.

FIG. 8 is a chart illustrating the measured sound pressure level (SPL) for the F404-402 engine at Mil-Pwr, N2=96.5% (Point 10S of the engine cycle deck) without the corrugated seals of the present invention ("baseline") and with six corrugated seals as described above with reference to FIGS. 3–7. As FIG. 8 demonstrates, there is an appreciable reduction in the SPL at each measurement location when the corrugated seals are used. Specifically, there is as much as a 3 dB reduction in the rear arc (90–180°), and a 5 dB reduction in the forward arc (0–90°).

Figure 9:
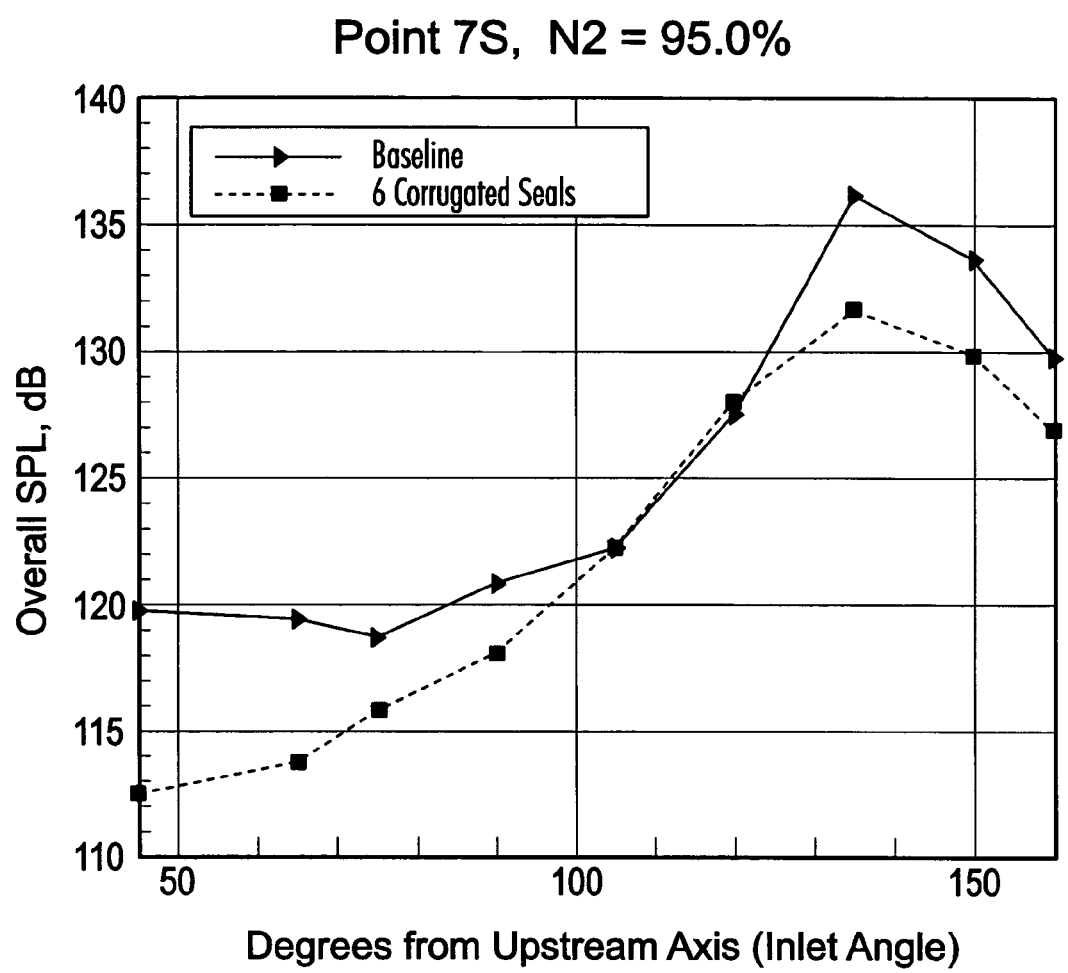
FIG. 9 is a chart illustrating the measured sound pressure level for a GEAE F404-402 engine at N2=95.0% based on model testing, specifically comparing the measured sound pressure level with and without the corrugated seals of the present invention.

FIG. 9 is a chart illustrating the measured sound pressure level (SPL) for the F404-402 engine at N2=95.0% (Point 7S of the engine cycle deck) without the corrugated seals of the present invention ("baseline") and with six corrugated seals as described above with reference to FIGS. 3–7. Again, there is an appreciable reduction in the SPL at almost every measurement location when the corrugated seals are used.

Figure 10:
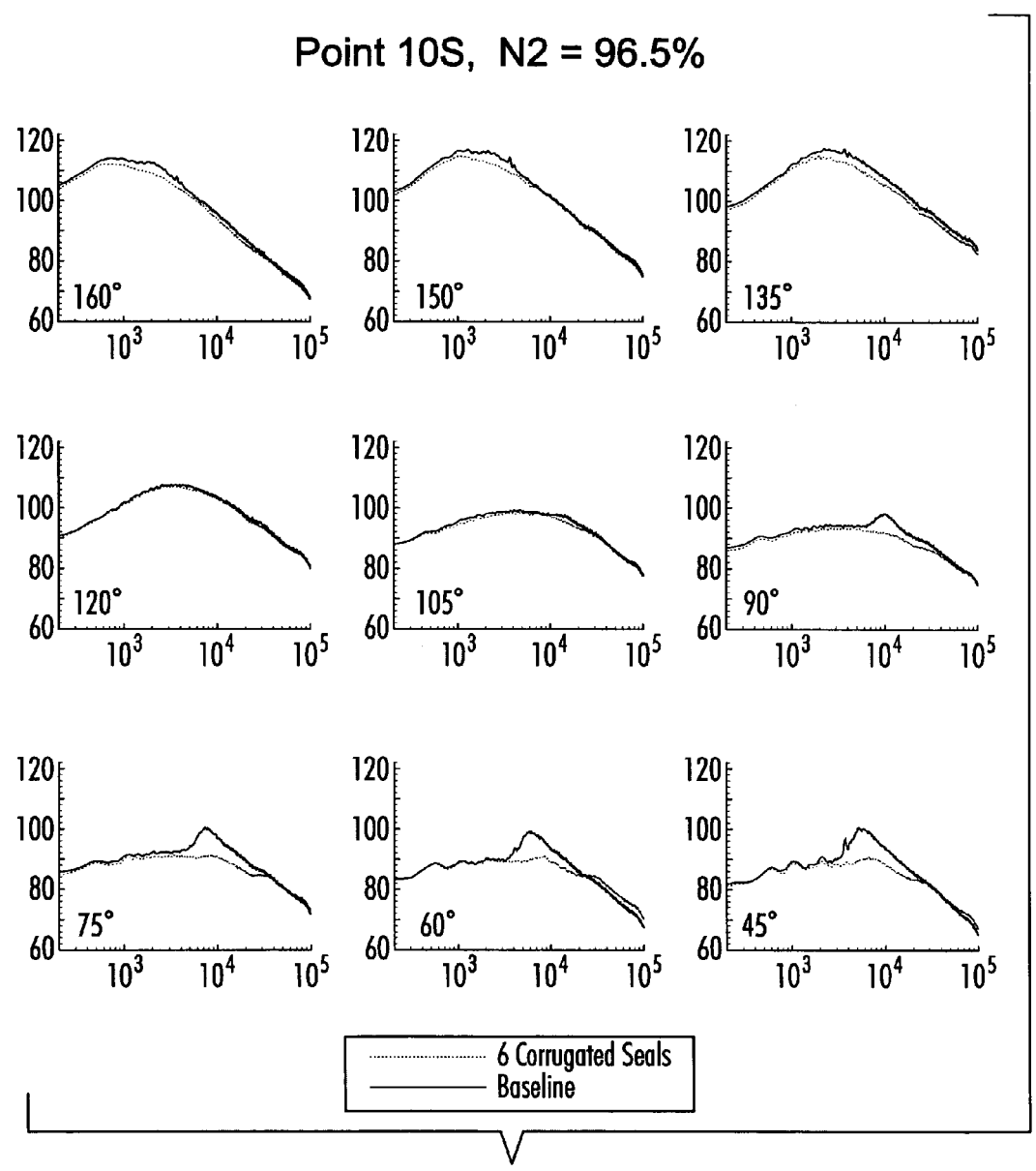
FIG. 10 includes charts of nine acoustic narrow-band spectral comparisons from model testing, specifically comparing the measured sound pressure level for a GEAE F404-402 engine at Mil-Pwr, N2=96.5% with and without the corrugated seals of the present invention.

FIG. 10 includes charts of nine acoustic narrow-band spectral comparisons, specifically comparing the measured sound pressure level for the F404-402 engine at Mil-Pwr, N2=96.5% without the corrugated seals of the present invention ("baseline") and with six corrugated seals, as described above with reference to FIGS. 3–7. The acoustic narrow-band spectral comparisons are for inlet angles from 45° to 160°. As the charts of FIG. 10 demonstrate, the baseline spectra contain significant shock noise content as exhibited by the spectral shown near $10^4$ hertz at angles of 45–90°. However, all traces of such shock noise are removed through use of the corrugated seals of the present invention. At angles between 90° and 180°, turbulence-generated or jet mixing noise dominates the acoustic spectrum. However, some noise reduction is still observed at these angles due to the selection of the super ellipse shape for the corrugated seal. As described above, such a cross-sectional shape produces strong counter-rotating vorticity for the desired forced mixing of high-speed with low-speed flow.

Figure 11:
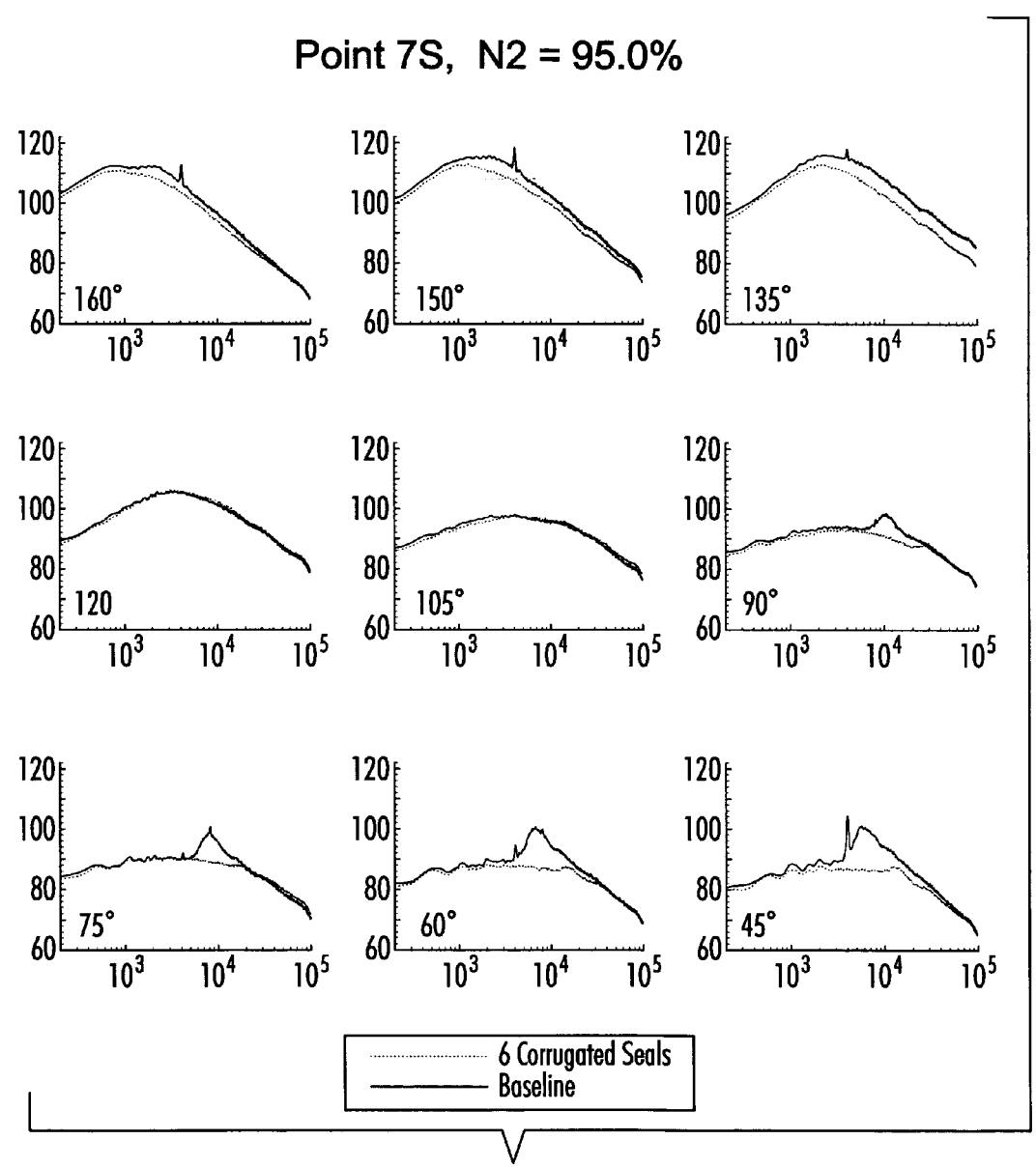
FIG. 11 includes charts of nine acoustic narrow-band spectral comparisons from model testing, specifically comparing the measured sound pressure level for a GEAE F404-402 engine at N2=95.0% with and without the corrugated seals of the present invention.

FIG. 11 includes charts of nine acoustic narrow-band spectral comparisons, specifically comparing the measured sound pressure level for the F404-402 engine at N2=95.0% without the corrugated seals of the present invention ("baseline") and with six corrugated seals, as described above with reference to FIGS. 3–7. Similar to the results described above with reference to FIG. 10, all traces of shock noise are removed through use of the corrugated seals of the present invention. Furthermore, there is a reduction of turbulence-generated or jet mixing noise.

Figure 12:
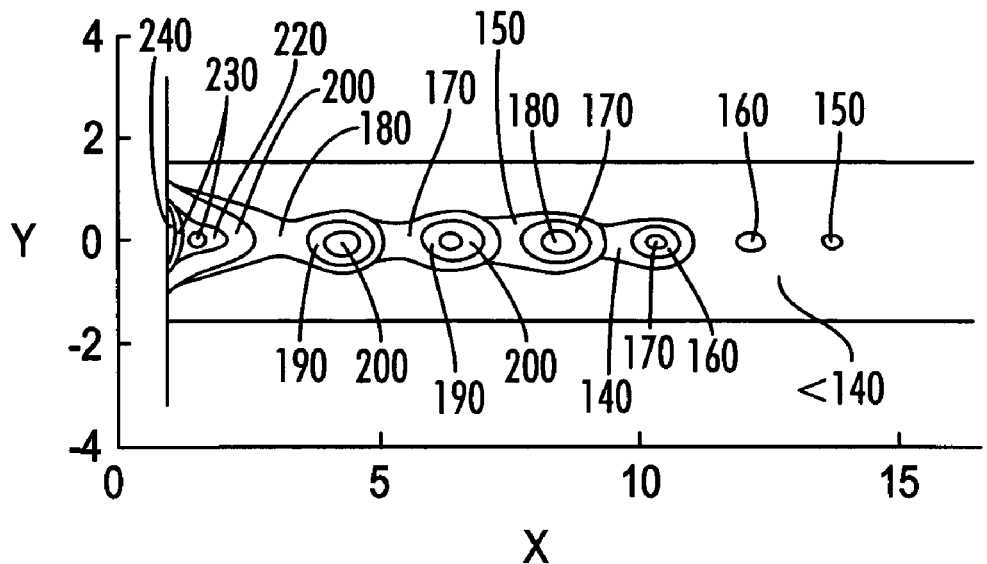
FIG. 12 is a representation of the infrared image for a nozzle without the corrugated seals of the present invention at Mil-Pwr; N2=96.5% in model testing.
Figure 13:
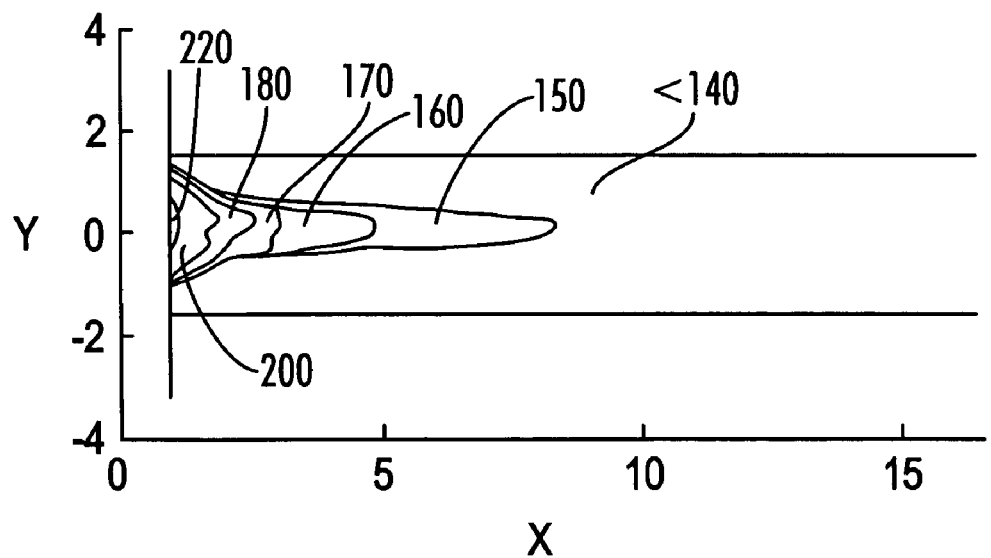
FIG. 13 is a representation of the infrared image of a nozzle with the corrugated seals of the present invention at Mil-Pwr, N2=96.5% in model testing.

Finally, as part of the model testing, a study was conducted to determine the potential for reduction of the exhaust plume infrared (IR) emission. In this regard, a short wave imaging radiometer was used to image the exhaust plume with and without the corrugated seals. FIG. 12 is a representation of the IR image for a baseline nozzle without the corrugated seals at Mil-Pwr, N2=96.5%, whereas FIG. 13 is a representation of the IR image of the nozzle with six corrugated seals at Mil-Pwr, N2=96.5%. Comparing FIGS. 12 and 13, it becomes apparent that there is an appreciable reduction in emissions. Achieving reduced infrared emissions is especially important for military applications since the major weapon used against military aircraft, such as the U.S. Navy's F/A-18 E/F Super Hornet, is a heat-seeking missile. Reduced infrared emissions decreases the probability that the missile will be able to lock-on and destroy the aircraft. In this regard, referring again to FIGS. 12 and 13, infrared radiance is proportional to the fourth power of the plume temperature. Accordingly, a heat-seeking missile would have to approach the exhaust plume at much reduced distances to lock-on, thereby increasing the probability for successful evasive maneuver by the targeted aircraft.

Engine Testing

For further confirmation of the efficacy of the method and device of the present invention as described above, testing of a F404-400 engine manufactured by General Electric Aircraft Engines of Cincinnati, Ohio was conducted at the Naval Air Warfare Center Aircraft Division at Lakehurst, N.J. (NAWCADLKE). For purposes of this testing, the corrugated seals were designed for N2=95.5% (Point 8S of the engine cycle deck).

Figure 14:
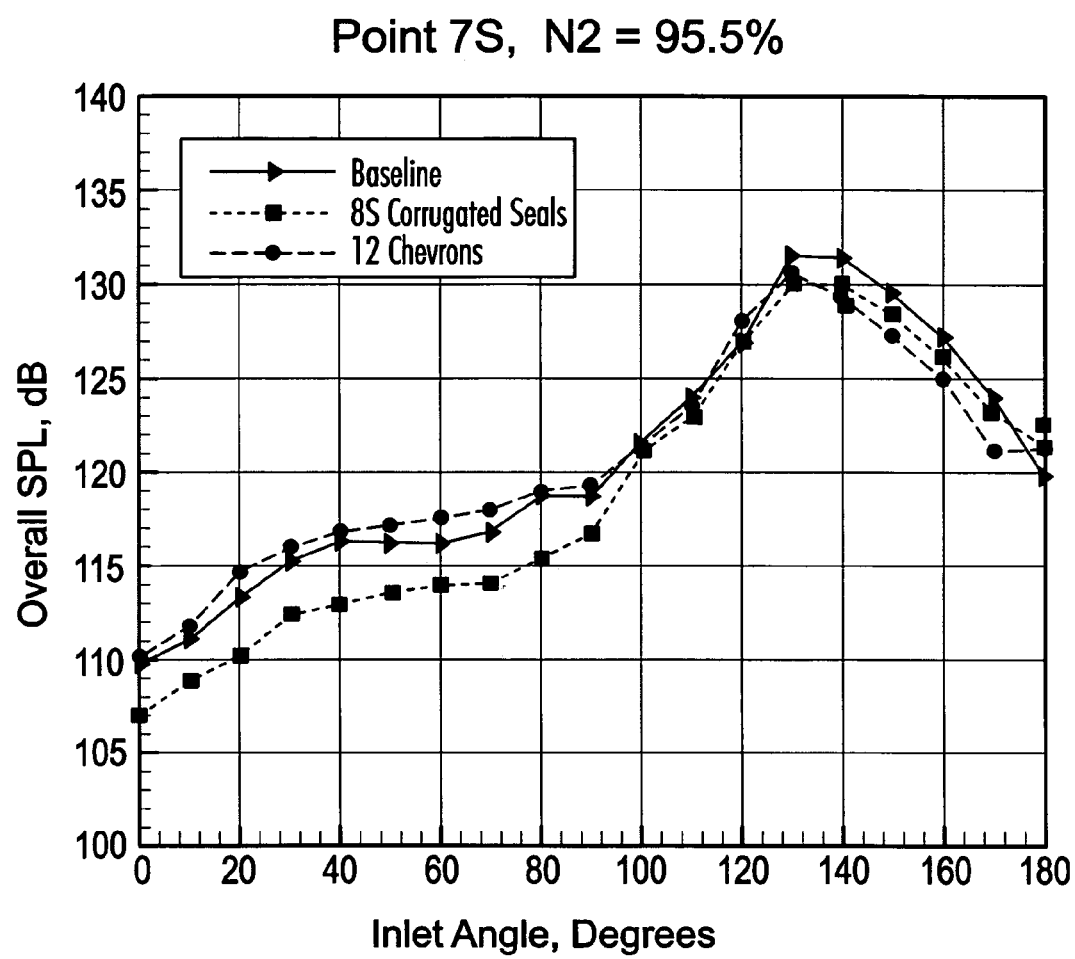
FIG. 14 is a chart illustrating the measured sound pressure level (SPL) for a GEAE F404-400 engine at N2=95.5% based on actual engine testing, specifically comparing the measured sound pressure level with and without the corrugated seals of the present invention.

FIG. 14 is a chart illustrating the measured sound pressure level (SPL) for the F404-400 engine at N2=95.5% (Point 8S of the engine cycle deck) at discrete angles ranging from 0° to 180° relative to the engine inlet axis. Specifically, this chart compares the SPL without the corrugated seals of the present invention ("baseline") and with six corrugated seals as described above with reference to FIGS. 3–7. As FIG. 14 demonstrates, consistent with the above-described model testing, there is an appreciable reduction in the SPL at each measurement location when the corrugated seals are used. Specifically, for the forward arc angles (0–90°), the corrugated seals of the present invention significantly reduce noise due to elimination of shock noise, and the corrugated seals are also effective at reducing noise in the rear arc (90–180°) that is dominated by turbulence-generated or jet mixing noise. Furthermore, although not illustrated in the Figures, aero-performance measurements indicate that the use of the corrugated seals at N2=95.5% resulted in an additional 50 pounds of thrust. In other words, any effect on aero-performance was negligible.

Figure 15:
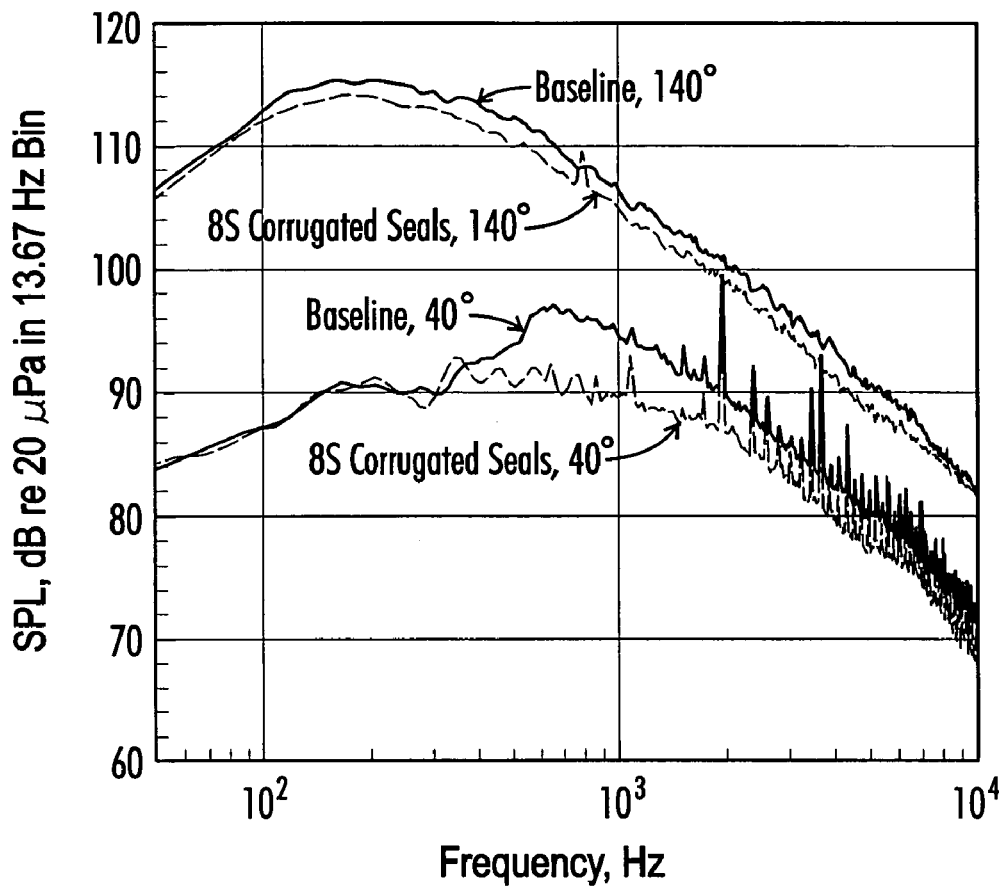
FIG. 15 is a chart illustrating narrow-band acoustic spectra associated with noise emission angles of 40° and 140° for a GEAE F404-400 engine at N2=95.5% based on actual engine testing.

FIG. 15 is a chart illustrating narrow-band acoustic spectra associated with noise emission angles of 40° and 140° for the F404-400 engine at N2=95.5%. The level of acoustic suppression resulting from use of the corrugated seals of the present invention is similar to that recorded in the model testing for both shock noise and turbulence-generated noise.

Figure 19:
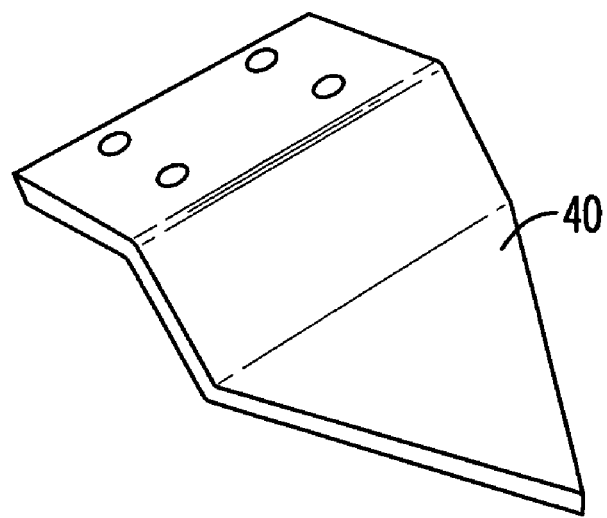
FIG. 19 is a perspective view of an exemplary chevron.
Figure 20:
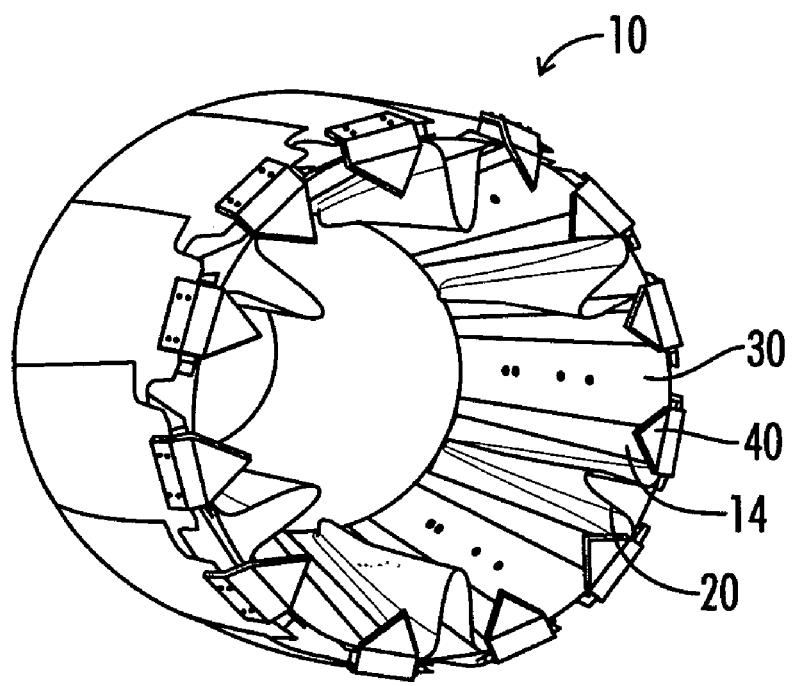
FIG. 20 is a perspective view illustrating the attachment of twelve chevrons to the outer divergent flaps of a nozzle, which also incorporates the corrugated seals of the present invention.

Furthermore, as part of the engine testing at NAWCADLKE, engine testing was also conducted using prism-shaped extensions, known as chevrons, attached to the nozzle and extending into the exhaust stream to achieve greater levels of forced mixing of the high-speed exhaust with the slower moving surrounding air. An exemplary embodiment of such a chevron 40 is illustrated in FIG. 19, and FIG. 20 illustrates the attachment of twelve (12) such chevrons 40 to the outer divergent flaps 12 of a nozzle 10. Such use of prism-shaped extensions or chevrons is generally known the art. See, e.g., Grosch, C. E., Seiner, J. M., Hussani, M. Y., and Jackson, T. L., 1997, "Numerical Simulation of Mixing Enhancement In a Hot Supersonic Jet", Physics of Fluids, Vol. 9, Part 4, pp. 1125–1143, a publication which is incorporated herein by this reference. The chevrons 40 are essentially inverted Delta-Wings, whose planforms are noted for generation of high-lift or strong counter-rotating vorticity. The spacing of the chevrons 40 is critical for enhanced mixing and their projected area into the flow is related directly to performance loss, thus generally limiting their size to less than 1% of the nozzle exit area.

Referring again to FIG. 14, the chart illustrates that the measured sound pressure level (SPL) for the F404-400 engine at N2=95.5% using twelve chevrons is only improved in the rear arc (i.e., at inlet angles exceeding 90°) where the noise is dominated by turbulence-generated or jet mixing noise. Indeed, the use of the chevrons caused an increase in noise in the forward arc. In short, although the corrugated seals of the present invention and chevrons are effective at reducing noise in the rear arc that is dominated by turbulence generated or jet mixing noise, only the corrugated seals are effective in reducing noise in the forward arc because of their ability to reduce shock noise.

Figure 16:
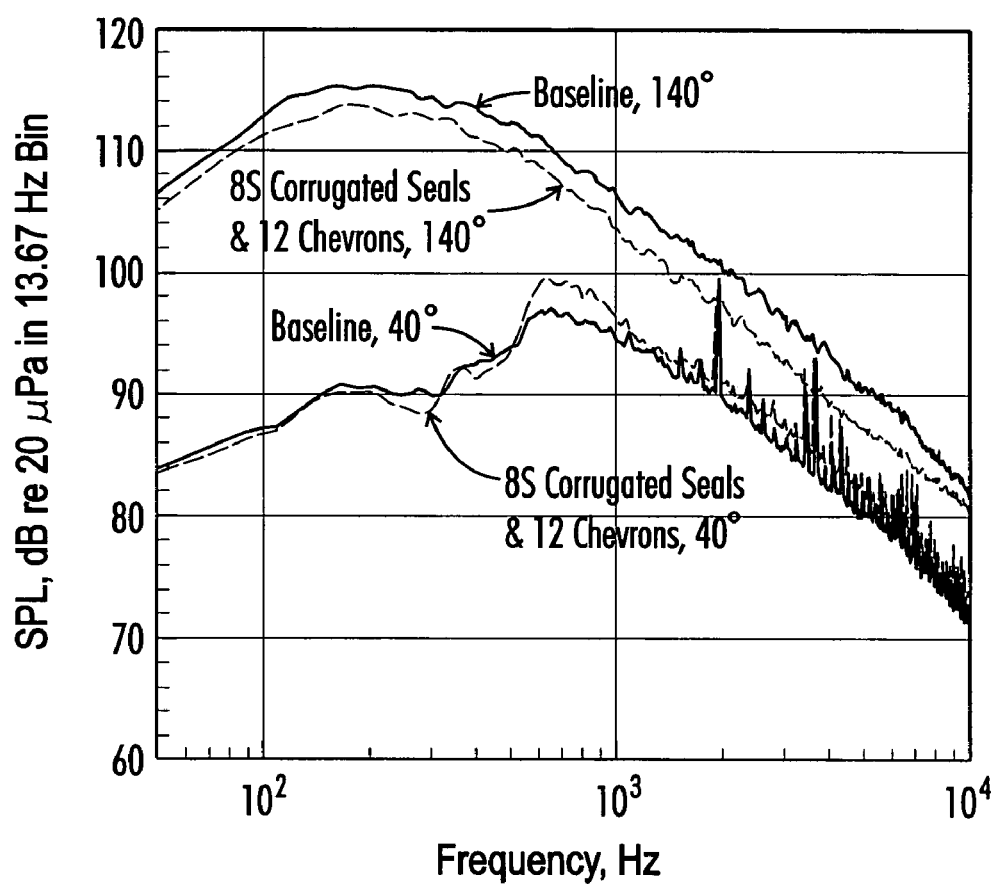
FIG. 16 is another chart illustrating narrow-band acoustic spectra associated with noise emission angles of 40° and 140° for a GEAE F404-400 engine at N2=95.5%, but in this case, the corrugated seals of the present invention are used along with twelve chevrons.

FIG. 16 is another chart illustrating narrow-band acoustic spectra associated with noise emission angles of 40° and 140° for the F404-400 engine at N2=95.5%, but in this case, the corrugated seals of the present invention are used along with twelve chevrons, as illustrated in FIG. 20. As the chart demonstrates; although the higher acoustic energy at 140° was significantly reduced, shock noise was increased.

Figure 17:
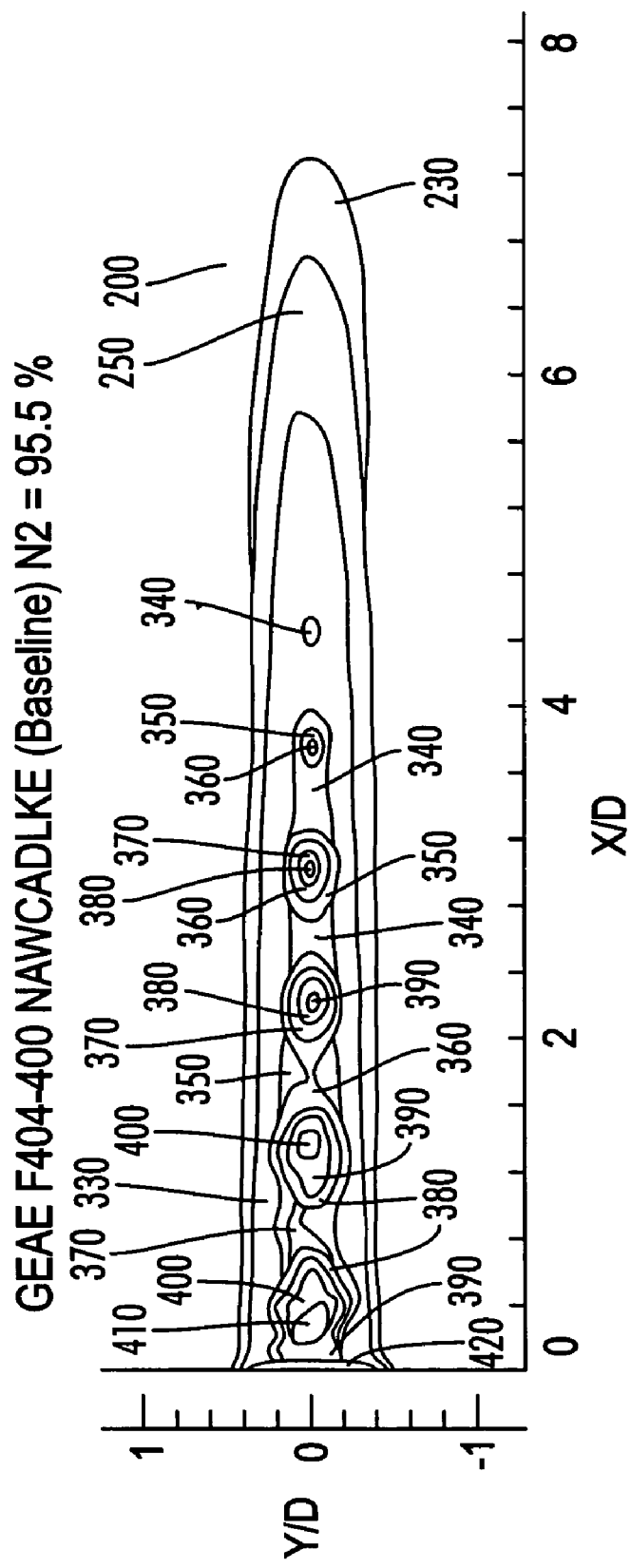
FIG. 17 is a representation of the infrared image for a nozzle without the corrugated seals of the present invention at N2=95.5% in actual engine testing.
Figure 18:
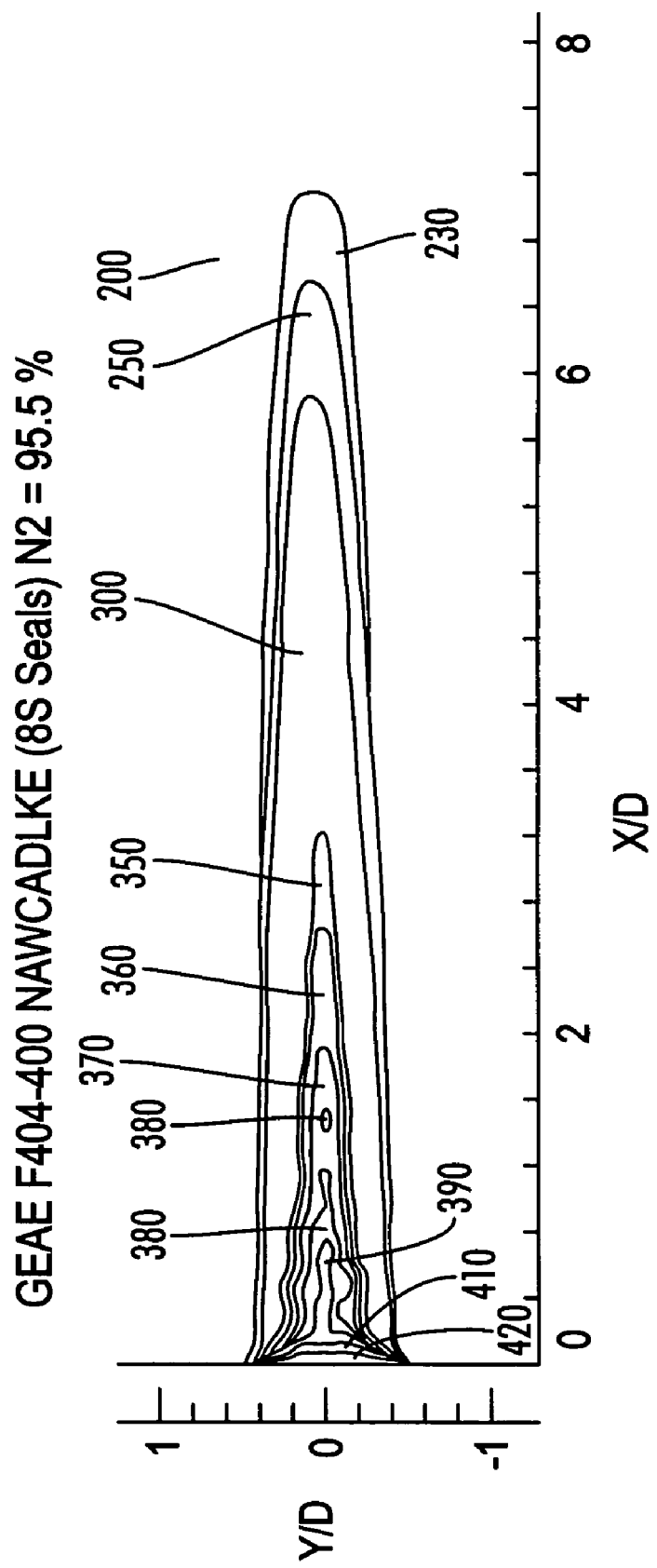
FIG. 18 is a representation of the infrared image of a nozzle with the corrugated seals of the present invention at N2=95.5% in actual engine testing.

Finally, similar to the model testing, a study was conducted to determine the potential for reduction of the exhaust plume infrared (IR) emission. FIG. 17 is a representation of the IR image for a baseline nozzle without the corrugated seals at N2=95.5%, whereas FIG. 18 is a representation of the IR image of the nozzle with six corrugated seals at N2=95.5%. Comparing FIGS. 17 and 18, it again becomes apparent that there is an appreciable reduction in emissions. As described above with reference to FIGS. 12 and 13, reduced infrared emissions decrease the acquisition time for missile lock-on, and consequently, reduce the probability that the missile will be able to lock-on and destroy the aircraft.

One of ordinary skill in the art will also recognize that additional embodiments and/or implementations are possible without departing from the teachings of the present invention or the scope of the claims which follow. This detailed description, and particularly the specific details of the exemplary embodiments and testing configurations disclosed therein, is given primarily for clarity of understanding, and no unnecessary limitations are to be understood therefrom, for modifications will become obvious to those skilled in the art upon reading this disclosure and may be made without departing from the spirit or scope of the claimed invention.

What is claimed is:

1. In an engine nozzle including internal divergent flaps, the improvement comprising:
   a predetermined number of corrugated seals for the internal divergent flaps, each such seal having a cross-sectional shape that is generally that of a truncated ellipse with a circular quadrant extension from each side of the ellipse, said corrugated seals producing fully expanded exhaust flow to substantially eliminate shock-generated noise and further generating a counter-rotating vorticity to force low speed mixing of surrounding ambient air with high-speed exhaust, thus reducing turbulence-generated noise.

2. The engine nozzle as recited in claim 1, in which the ellipse has a high aspect ratio.

3. The engine nozzle as recited in claim 2, in which the aspect ratio of the ellipse is approximately 4:1.

4. The engine nozzle as recited in claim 1, in which appropriate dimensions of the truncated ellipse and the circular quadrant extension from each side of the ellipse are determined from a Method of Characteristics (MOC) solution based on certain operating parameters of the engine that produce fully expanded exhaust flow.

5. The engine nozzle as recited in claim 4, in which the certain operating parameters of the engine that produce fully expanded exhaust flow are based on an identified mission profile.

6. The engine nozzle as recited in claim 4, in which the certain operating parameters of the engine are determined through a simulation that generates aerothermal numerical representations to characterize engine performance.

7. The engine nozzle as recited in claim 1, in which appropriate dimensions of the truncated ellipse and the circular quadrant extension from each side of the super ellipse are determined by an area distribution that produces fully expanded flow.

8. The engine nozzle as recited in claim 1, and further comprising a predetermined number of chevrons attached to the engine nozzle, each such chevron extending into the exhaust flow to achieve greater levels of forced mixing of the high-speed exhaust with the surrounding ambient air.

9. The engine nozzle as recited in claim 1, in which every other seal for the internal divergent flaps is a corrugated seal having a cross-sectional shape that is generally that of the truncated ellipse with the circular quadrant extension from each side of the ellipse.

10. The engine nozzle of claim 9, wherein the ellipse is a super ellipse.

11. The engine nozzle of claim 1, wherein the ellipse is a super ellipse.

12. In an engine having a nozzle including internal divergent flaps, the improvement comprising:
    a predetermined number of corrugated seals for the internal divergent flaps, each such seal having a cross-sectional shape that is generally that of a truncated ellipse with a circular quadrant extension from each side of the ellipse, said corrugated seals producing fully expanded exhaust flow to reduce infrared emissions of the engine.

13. The engine as recited in claim 12, in which the ellipse has a high aspect ratio.

14. The engine as recited in claim 13, in which the aspect ratio of the ellipse is approximately 4:1.

15. The engine of claim 12, wherein the ellipse is a super ellipse.

16. In an engine having a nozzle including internal divergent flaps, the improvement comprising:
    a predetermined number of corrugated seals for the internal divergent flaps, each such seal having a cross-sectional shape that is generally that of a truncated ellipse with a circular quadrant extension from each side of the ellipse, said corrugated seals producing fully expanded exhaust flow to increase thrust.

17. The engine as recited in claim 16, in which the ellipse has a high aspect ratio.

18. The engine as recited in claim 17, in which the aspect ratio of the ellipse is approximately 4:1.

19. The engine of claim 16, wherein the ellipse is a super ellipse.

* * * * *